2,894,621
Patented July 14, 1959

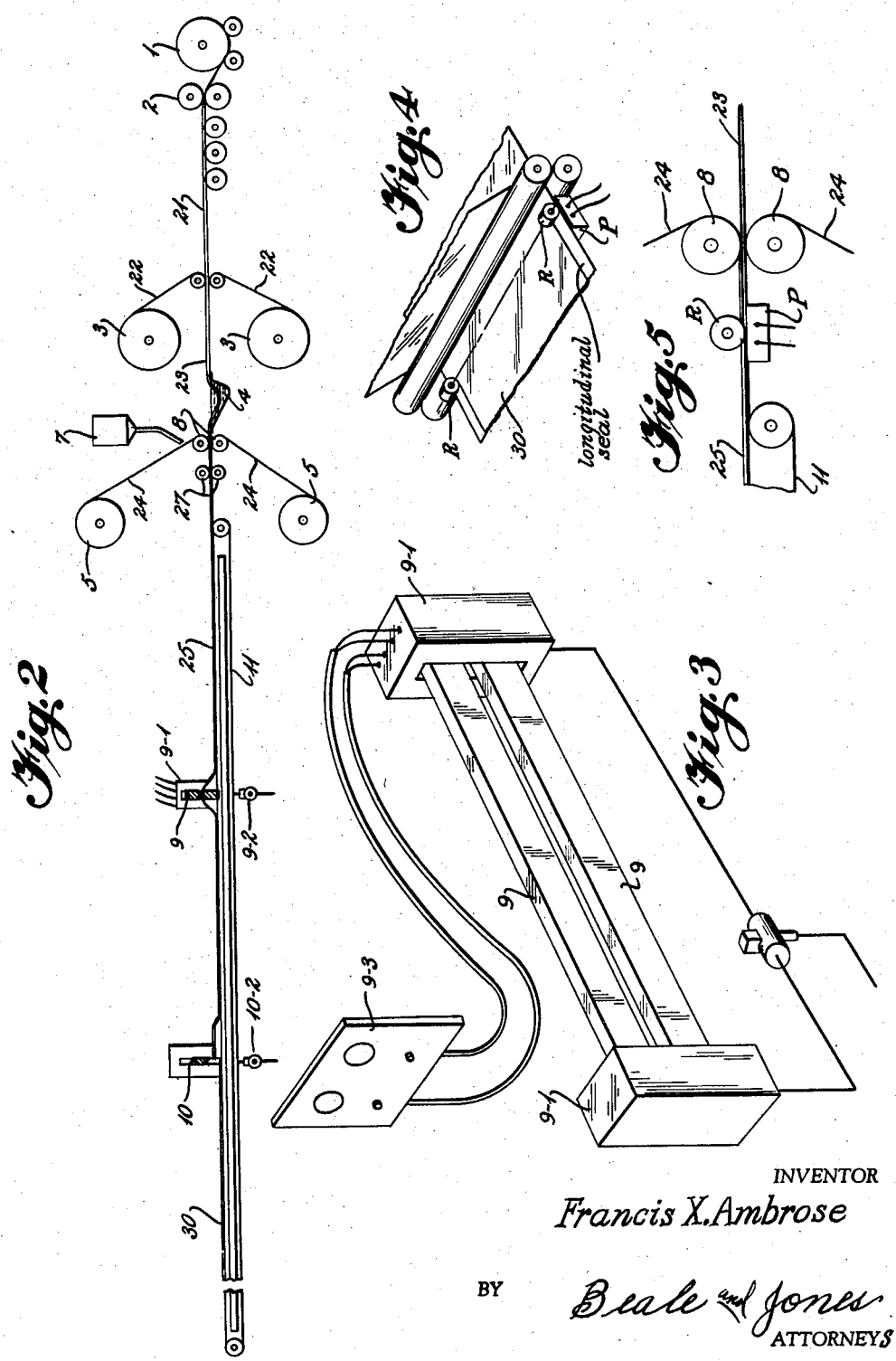

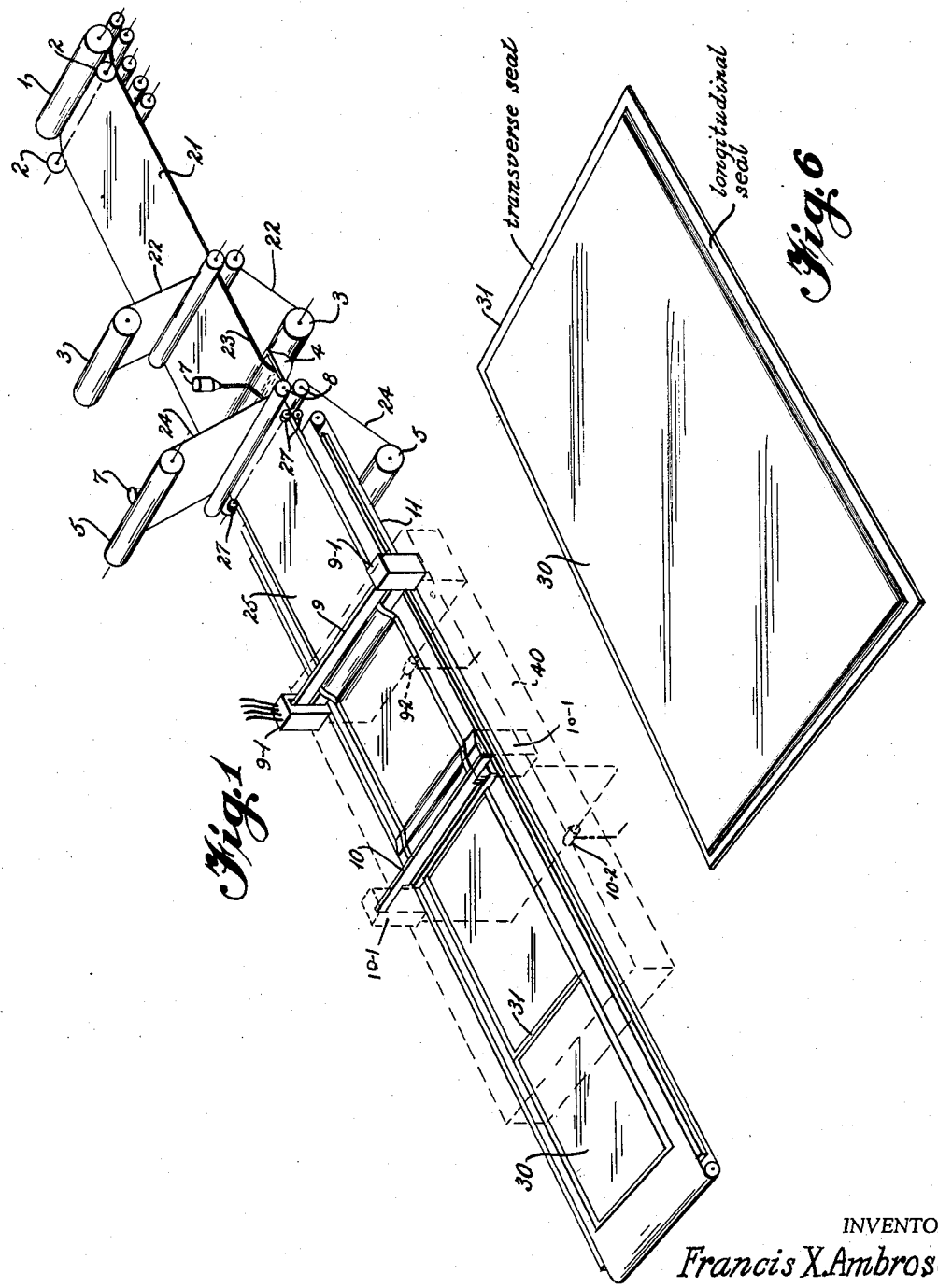

2,894,621
PROCESS OF MAKING REINFORCED PLASTIC PANELS AND ARTICLE PRODUCED THEREBY

Francis X. Ambrose, San Diego, Calif., assignor to Alsynite Company of America, San Diego, Calif., a corporation of California Application August 17, 1956, Serial No. 604,738

12 Claims. (Cl. 206—60)

This invention relates to new and useful improvements in the method of forming reinforced plastic panels. More, particularly, the invention relates to improvements in the process of making reinforced plastic sheets wherein a mat of glass fibers is impregnated with a resinous composition containing a polyester, a catalyst, and styrene, and the impregnated mat is simultaneously encased within an envelope made of two cover sheets of cellophane and passed through two press rolls which regulate the amount of resin retained in the mat.

There are two basic processes for making panels of this type. One type of process is continuous. This involves a tremendous capital investment in the curing ovens, and to date, has not been very attractive from a commercial standpoint. Processes of this type are exemplified by the disclosure of the Upson United States Patent 2,433,965, issued January 6, 1948, and in the Green United States Patent 2,496,911, issued February 7, 1950. Furthermore, when continuous ovens are employed for curing the impregnated mat, the cure is generally a fast cure which produces a product which does not favorably compare with a product that is cured slowly in a batch oven. The slower cure generally produces a clearer and stronger panel. To obtain the same results in a continuous oven, an oven of very great length would be needed.

In the second type of process, the more familiar batch cure process, cover sheets of cellophane, cellulose acetate or similar flexible yet relatively impervious material encasing a short length of impregnated mat are continuously fed through a pair of press or squeeze rolls. These squeeze rolls are controlled manually and are operated intermittently. The encased, impregnated mat of glass fibers is severed into lengths corresponding to the desired panel length but allowing a slight amount for trimming. After the short length of impregnated mat has passed between the squeeze rolls, and is completely supported on the conveyor customarily placed after the squeeze rolls, movement of the squeeze rolls may be discontinued until another length of impregnated mat is ready. In this batch process, a relatively wide strip of empty cellophane envelope is interposed along the length of the laminate between each length of impregnated mat. Any excess resin frequently finds its way into this free space in the envelope between the opposed cover sheets, where it is cured in subsequent operations and is a waste products. While it is customary for excess resin to creep lengthwise of the cover sheets, there may also be lateral creepage of the resin between the cover sheets, and this too is frequently wasted. When the cover sheets are severed, usually approximately half way between each length of impregnated mat, they are then placed in a shaping mold. The shaping mold may simply be pieces of shaped metal such as aluminum, and a number may be superposed for simultaneous oven curing if desired. Usually, the impregnated mat, after shaping, is slowly cured in an oven for a sufficient length of time to produce a complete cure in the particular resin formulation employed. Afterward, the cured panels are removed, the cover sheets are stripped off, and the panels are trimmed so that they are uniform.

In the batch process just described, which is frequently employed in industry today because of the superiority of batch curing over continuous curing, there is a considerable waste of resin because of continuous creepage, both laterally and longitudinally of the cover sheets. Furthermore, the cellophane cover sheets extend many inches beyond the edges of the impregnated mat in all directions, and the consumption of cellophane or other similar flexible material thus greatly exceeds the amount of finished panel which is produced.

An object of the present invention is to provide a batch-type process, or a semi-continuous type process, in which the amount of resin wastage and the amount of cellophane or other cover sheeting employed is considerably reduced. A more generalized object of the invention is to provide an economical process for the production of glass fiber reinforced plastic panels.

A further object of the invention is to provide a method for the continuous feeding of an impregnated mat of glass fibers between two opposed cover sheets through a pair of squeeze rollers, with selective curing or increasing of the viscosity of the resinous mass by other means at a small lateral strip of the resin in the impregnated mat to a state wherein it is immobile and tacky and adheres to the adjacent cover sheets in the lateral strip area, severing of the laminate in the middle of the strip of tackified and immobilized resin, and shaping and curing of the impregnated mat.

Another object of the invention is to provide a means for sealing the lateral edges of the cover sheets either at the squeeze rollers, or immediately thereafter, during the process of manufacturing reinforced plastic panels, whereby resin creepage in a lateral direction is minimized.

These and other objects of the invention are accomplished by a modification of the equipment and operations employed with the current batch process. As the batch process is ordinarily practiced, the mat of glass fibers, with or without thin surfacing mats of glass fibers on each side thereof, is fed into the resin trough, and thence into the nip of a pair of squeeze rollers. Cellophane or other cover sheets are applied around the impregnated cover mat as the mat passes through the squeeze rollers. The squeeze rollers serve the dual purpose of adjusting the resin content of the impregnated mat, and of regulating its thickness. The laminate thus formed by the cover sheets of cellophane or other material and the impregnated mat then passes onto a conveyor belt which supports the laminate and moves it in synchronism with the movements of the squeeze rollers. On the conveyor belt, the laminate may be again smoothed to eliminate any air pockets and to eliminate any creases which are in the cover sheets. It is to be emphasized that according to current batch cure practice, the fiber glass mat for impregnation is fed into the impregnating trough and through the squeeze rollers in precut lengths proportionate in size to the size of the finished panel which is desired.

According to the present invention, there are disposed along the conveyor belt, spaced from the squeeze rollers, an immobilizing means such as a heat sealing device and a laminate length cutter. The heat sealing device heats the laminate across its entire width sufficiently to immobilize and tackify the resin without rigidifying it. Spaced at a distance approximately equivalent to the length of a finished sheet from the heat sealing device is a laminate length cutter which may be employed to sever the laminate through the center of the immobilized tackified strip. Thus, the impregnated mat itself, at the immobilized and tackified strip, forms a sealing edge which is actually superior to the sealing obtained in the current batch cure process in which overlapped facing cellophane or other sheets provided the seal which excludes air and retains the resin in the laminate. This effects a considerable saving in cellophane and in resin.

In order to effect further savings in resin, the side edges of the laminate can be sealed. This can be accomplished in a number of ways. Thus, it is possible to employ heat sealing cellophane which may be continuously sealed by passing the sheets to be sealed over a heated plate and applying pressure on the sheets by a roll cooperating with the plate operating immediately after the laminate leaves the squeeze rollers. Alternatively, adhesive may be applied to the cellophane immediately prior to its passage through the squeeze rollers, so that the small edge rollers operating after the squeeze rollers serve merely to press the opposed cellophane surfaces into adherent engagement.

The squeeze rolls used in the present process may be those described in my copending patent application Serial No. 527,024, filed August 8, 1955, now Patent No. 2,818,904, issued January 7, 1958.

The invention may be better understood by reference to the drawings in which:

Fig. 1 is a perspective view of the apparatus employed in the laminate forming operation.

Fig. 2 is a diagrammatic side elevational view of the apparatus involved in the laminate forming operation shown in Fig. 1;

Fig. 3 is a perspective view of a pair of movable heat sealing bars used to immobilize a strip of the laminate;

Fig. 4 is a fragmentary perspective view of a heating plate and cooperating pressure roll for edge sealing;

Fig. 5 is a side elevation of the apparatus shown in Fig. 4 including the end of an endless conveyor; and Fig. 6 is a perspective view of a section of laminate showing the edge sealing.

Since the molding and curing operations are conventional, they are not illustrated.

In the process illustrated, a continuous length 21 of a mat of glass fibers may be unwound as needed from a bulk roll 1. Edge cutting wheels 2 may be employed to trim the edges of the mat 21 if desired or necessary, as it is unwound from the roll. For the best appearing finish and highest strength, the glass mat 21 may be covered on each surface thereof with sheets of surfacing mat 22, of glass monofilaments, which may be dispensed from cylindrical rolls 3 of this mat. Such surfacing mat is an additional expense but is frequently desirable for the production of a superior product. The surfacing mat may have a thickness, for example, on the order of 10 mils. This three-ply mat 23 is then passed into an impregnating trough 4, where the mat is carefully immersed in the liquid resin composition filling the trough.

From the trough, the impregnated mat is fed directly into the nip of a pair of squeeze rollers 8, and simultaneously, a pair of flexible, resin-impervious cover sheets 24 of cellophane or similar material are disposed on each surface of the impregnated mat, forming a loose laminate 25 which nevertheless has a good deal of coherence after passage through the squeeze rollers 8, since the squeeze rollers remove substantially all of the air from between the cellophane cover sheets, and the laminate is held together by external air pressure. The cellophane cover sheets 24 are advantageously unwound from supply rolls 5, maintained adjacent the squeeze rollers 8.

After the laminate 25 leaves the squeeze rollers 8, it passes onto and is supported by a conveyor belt 11. Immediately after the laminate 25 comes to rest on the conveyor belt, any air bubbles or creases are manually removed. Curved wires as squeegees are passed along the laminate in such a direction as to expel the air or remove the crease. Where edge sealing of the laminate is desired, an edge sealing adhesive may be dispensed from a pair of dispensing pots 7 preceding the squeeze rollers 8, directly onto the appropriate marginal edges of the upper cellophane cover sheet 24 only. Two pair of opposed pressure rollers 27 may be positioned on the discharge side of the squeeze rollers 8 to urge the cover sheets into adhered engagement along their marginal edges. After the creases and any air bubbles have been removed, the laminate 25 moves onto the immobilizing means. An example of an immobilizing means is a pair of heat sealing bars 9. By any conventional means, the heat sealing bars 9 may be maintained out of contact with the laminate except when it is actually in use. For example, the heat sealing bars 9 may be mounted in end shoes 9–1 which are pneumatically or hydraulically operated by the actuator 9–2, typically shown. The heat sealing bars 9 may be spring biased away from their heat sealing position which is in contact with the laminate 25. The bars 9 are electrically heated as shown by a control panel 9–3. Further along the conveyor belt 11, spaced at a distance from the heat sealing bars 9 equivalent to the length of one finished panel, there is disposed a laminate length cutter generally indicated at 10. This cutter may be mounted at 10–1 similar to heat bars 9 and actuated by a power device 10–2 designed as to sever the immobilized, tackified strip of resin approximately along its center, so that each length of laminate 30 thus produced is sealed at each lateral end thereof by a strip 31 of immobilized, tackified resin. This prevents the longitudinal creepage of resin and also eliminates any wastage of cellophane or other cover sheet material, since the resin itself forms the seal rather than overlapped pieces of impervious cover sheet material heretofore used. Where the marginal edges have been sealed with adhesive or by heating sealing, a completely sealed envelope may be obtained. This will produce even further economies in resin and in cellophane cover sheets, since cover sheets of considerable width are necessary where the laminate is sealed by overlapped portions of the cover sheets. This extra material is not necessary where the overlapped portions of the cover sheets are adhered or otherwise secured together.

It will be appreciated that the width of the heat sealing bar 9 is approximately twice the width of each individual strip 31 of immobilized and tackified resin. The heat sealing bar 9 produces a relatively wide strip of immobilized and tackified resin which is cut roughly in half by the laminate length cutter 10 so that the immobilized and tackified resin forms a seal for each length 30 of the severed laminate.

The severed lengths 30 are then shaped, if shaping is desired, and cured in an oven. If flat panels are desired, the lengths 30 are simply disposed under very moderate pressure between two flat plates. The curing temperature and time depend upon the particular resin employed.

While it is possible to seal the marginal edges of the cellophane cover sheets with adhesive, excellent results are also obtained where heated rollers are substituted for the pressure rollers 27 or heated plates P and pressure rolls R as shown in Figures 4 and 5. These heated rolls R desirably operate directly on the laminate itself, immediately after the laminate is discharged from the squeeze rollers 8 as it passes over heated edge plates P so as to immobilize and tackify the resin. In still another alternative form of the invention, the squeeze rollers 8 may be provided with collars which tend to confine the resin to the mat and prevent its lateral creepage.

The above-described method illustrated in the drawing is a semi-continuous or intermittent process only. It is contemplated within the scope of this invention to employ movably mounted sealing bars 9 and laminate length cutters 10 which move with the conveyor and then reverse their direction. During this movement with the conveyor, and at the same speed, they seal and cut respectively. Mechanism shown in the box at 40 movably mounts the bars 9 and cutter 10 for movement along the conveyor.

Where the laminate consists simply of a single thickness of mat impregnated with resin and enclosed between two cover sheets of cellophane, the top heat sealing bar 9 alone may be heated. However, where multiple plies are used, as in the described process, where surfacing sheets 22 are employed to form a triple-ply mat 23, the lower bar 9 should also be heated in order to produce a uniform immobilization and gelling throughout the entire thickness of the laminate. Simple contact pressure alone between the heat sealing bars 9 and the laminate is sufficient during the heat sealing operation. While I have here shown as an example a heat sealing means to immobilize a strip across the laminate, other immobilizing means may be used. These would increase the viscosity of the resin to make it tacky and adhere to the cover sheets such as by cooling. In this immobilized state a barrier would be formed to prevent the resin thereadjacent from flowing and also an area for a transverse cut is provided.

Many resinous compositions are suitable for use in the process of this invention, as will readily be appreciated. Polyesters are the preferred type of resin and may be prepared by methods well known in the prior art. One preferred group of resins are those resins known as unsaturated polyesters. Chemically these resins are formed by the reaction of a polyhydric alcohol and a polybasic acid, either or both of which contain a doubly bonded pair of carbon atoms. These resins are usually carried in a liquid monomer solvent of an unsaturated type. These unsaturated polyester resins have the facility of cross-linking through their active double bonds and will also cross-link through the unsaturated monomer solvent. A typical resin of this type is produced from the reaction of propylene glycol with the anhydrides of maleic and phthalic acid. Monomeric styrene is used with this resin to give a polyester with the desired cross-linking ability. Organic peroxides, amines, and mercaptans are used as catalysts to initiate and acelerate these cross-linking reactions. Other resins of this type are disclosed in U.S. Patent 2,195,362. Generally, however, all unsaturated polyesters are satisfactory.

*Example 1*

To give a specific example of the process, a heavy reinforcing mat of 2" chopped strands felted in a sheet in a random pattern, having a weight of 1¾ ounces per square foot, was enclosed between two surfacing mats of staple monofilaments having a thickness of 10 mils. This three-ply mat was then immersed in a resinous composition containing the following:

| | Parts |
|---|---|
| Selectron 5051-A | 100 |
| Styrene | 18 |
| Cumene hydroperoxide | 0.6 |
| Benzoyl peroxide | 0.1 |

This resinous composition has a viscosity of approximately 250 centipoises at room temperature.

This impregnated three-ply mat was then covered by cellophane cover sheets as it passed between two squeeze rollers which applied moderate pressure and regulated the resin content by applying a very gentle pressure to the mat. As the laminate left the squeeze rollers 8, a series of heated marginal sealing rollers gelled the resin along the marginal edges thereof. A set of rollers nearest the squeeze rollers were maintained at a temperature of 170° F. The second rollers in the series were maintained at 230° F. These rollers were spring loaded into contact with the marginal edges of the impregnated mat, and during the intermittent stoppages of the mat, were automatically raised out of contact wit the mat to prevent over-curing at this point, which would be undesirable.

As the impregnated mat went farther along the conveyor belt, it passed over a heated base bar and under a heat sealing bar. Both of these were maintained at a temperature of approximately 390° F. Normally, the laminate passed rapidly over the base bar, with the heat sealing bar being raised out of contact with the laminate. Intermittently, as will be further described hereafter, the heat sealing bar was lowered into contact with the laminate when it was not in motion. The conveyor belt and squeeze rollers were synchronized and were stopped simultaneously in order to arrest the motion of the laminate. The heat sealing bar was lowered into contact with the laminate and no pressure was applied. After a contact of approximately 15 seconds, the resin was rendered immobile and very tacky. While the laminate was at rest, operators stationed between the heat sealing bars and the squeeze rollers removed air bubbles and creases from the cover sheets. Spaced away from the squeeze rolls along the laminate from the heat sealing bar there was disposed a laminate length cutter. This consisted simply of a knife and cooperating block. The distance between the laminate length cutter and the heat sealing bar was the desired product panel length of approximately 8 feet.

During the stoppage of the conveyor belt and the squeeze rollers, the heat sealing bar and laminate length cutter were operative. The laminate length cutter severed the laminate into the desired lengths, across the approximate center of the immobilized and tackified resin which had been partially cured by the heat sealing bar.

The severed lengths of laminate, which were completely sealed within their cover sheets by the gelled, immobilized and tackified resin completely around their marginal periphery, were placed between corrugated, smooth-surface method mold sheets, which were superposed, weighted to provide mild pressure, and were cured in an oven at approximately 230° F. for about 35 minutes. After curing, the cellophane cover sheets were stripped off, and any necessary trimming was done to produce uniformity of size in the various panels.

In the foregoing specific example and general description, reference has been made to the use of reinforcing mats of glass fibers. It should be appreciated, however, that many other reinforcing materials may be employed, such as fabrics and other fibrous material. Similarly, with respect to the specific resins mentioned, many other resins may be substituted for those referred to above. Obviously, for the successful practice of the invention, the resin must be one which is susceptible of being rendered immobile and tacky by the heat sealing bar, or by other means of increasing the viscosity in the relatively narrow strip areas, in order to obtain the lateral strip which is sealed, to retain the resin within the cover sheets and prevent longitudinal creepage. Furthermore, the resin must reach this immobile and tacky state without becoming rigid, since it is necessary after severing the laminate into lengths to shape the laminate and then cure the resin. In an arrangement also utilized, the heat bars 9 above and below the mat are arranged with a split conveyor so that each bar may be moved into and out of contact with a narrow strip of the impregnated mat.

While there has been illustrated a heat treatment stage to immobilize the resin at the sealed strips 31 of laminate lengths 30, it is within the scope of my invention to immobilize the resin in these sealed strips by other means.

One particular purpose of my invention is the causing of the rapid increase of viscosity in a relatively narrow localized area of the mass to a point where it resists flow and can be cut, handled and formed into mold shapes without destroying the integrity of the film envelope. In the example given above, this rapid increase in viscosity is brought about by reacting the narrow resinous strip through heat to a point where it reaches a "gell" state. Other conventional physical principles may be taken advantage of in increasing the viscosity of the resinous means in the narrow strip to a point where the resin is virtually no longer fluid for a temporary or permanent period. To prevent creepage, the strip as at 31 could be chilled which would chill the resin therein and reduce its viscosity so that it will not creep or flow. This would also immobilize the resin and prevent creepage thereof and seal off the ends of a selected section. The same step of cutting off at 9 would be used as in the heat application to get the resin.

I claim:

1. A method of making a reinforced plastic panel of a resinous composition capable of polymerizing to form rigid, solid structures, comprising impregnating a continuous mat of a porous fibrous base with said resinous composition, enclosing the impregnated base in an envelope of flexible relatively nonporous material secured together along its lengthwise marginal edges and forming a laminate, progressively compressing said laminate to expel excess liquid and entrapped air from said base, converting said resinous composition to a relatively immobile and tacky state in narrow strips across the width of said laminate, and then severing the laminate into lengths at an intermediate line in said strips, whereby each said length is enclosed within an envelope sealed across at least two ends thereof by said immobile and tacky resinous composition.

2. A method of making a reinforced plastic panel of a resinous composition capable of polymerizing to form rigid, solid structures, comprising providing a continuous mat of a porous, fibrous reinforcing base, covering at least one surface of said mat with a relatively thin surfacing mat to form a multiple ply reinforcing material, impregnating said multiple ply reinforcing material with said resinous composition, enclosing the impregnated material in an envelope of flexible relatively nonporous material secured together along its lengthwise marginal edges and forming a laminate, progressively compressing said laminate to expel excess resin and entrapped air therefrom, selectively converting said resinous composition to a relatively immobile and tacky state in narrow strips across the width of said laminate, and then severing the laminate into lengths at an intermediate line in said strips, whereby each said length is enclosed within an envelope sealed across at least two ends thereof by said immobile and tacky resinous composition.

3. A method of making a reinforced plastic panel of a resinous composition capable of polymerizing to form rigid, solid structures, comprising impregnating a continuous mat of a porous fibrous base with said resinous composition, enclosing the impregnated base in an envelope of flexible relatively nonporous material to form a laminate, lightly progressively compressing said laminate to expel excess liquid and entrapped air from said base, progressively sealing the marginal edges of said envelope, selectively converting said resinous composition to a relatively immobile and tacky state in a narrow strip across the width of said laminate at spaced apart positions, and then severing the laminate into lengths at an intermediate line in each of said strips, whereby each said laminate length is enclosed within an envelope sealed on all sides thereof.

4. A method of making a reinforced plastic panel of a resinous composition capable of polymerizing to form rigid, solid structures, comprising impregnating a continuous mat of a porous fibrous base with said resinous composition, enclosing the impregnated base in an envelope of flexible nonporous material impervious to said resinous composition to form a laminate, lightly progressively compressing said laminate to expel excess liquid and entrap air from said base, progressively sealing the marginal edges of said envelope, selectively heating a narrow strip across the length of said laminate to convert a corresponding narrow strip of said resinous composition to an immobile and tacky state, and then severing the laminate into lengths at an intermediate line in said strip, whereby each said laminate length is enclosed within en envelope sealed on all sides thereof.

5. A method of making a reinforced plastic panel of a resinous composition capable of polymerizing to form cross-link three dimensional molecular structures, comprising impregnating a continuous mat of chopped glass fibers with said resinous composition, enclosing the impregnated base in at least one sheet of cellophane folded over the impregnated base to form a laminate, progressively compressing said laminate to expel excess liquid and entrapped air from said base, sealing the marginal edge of said folded together sheets, selectively heating a narrow strip across the width of said laminate to convert a correspondingly narrow strip of said resinous composition to a relatively immobile, gelled, and tacky state, and then severing the laminate into lengths at an intermediate line in said strip, whereby each said length is enclosed within an envelope sealed across two ends thereof by said relatively immobile and tacky resinous composition.

6. A method of making a reinforced plastic panel of a resinous composition capable of polymerizing to form cross-link, three dimensional structures, comprising providing a continuous mat of chopped glass fibers, covering at least one surface of said mat with a relatively thin surfacing mat of glass monofilaments to form a multiple ply reinforcing material, impregnating said multiple ply reinforcing material with said resinous composition, enclosing the impregnated material in an envelope of cellophane secured together along the lengthwise edges to form a laminate, progressively compressing said laminate to expel excess resin and entrap dead air therefrom, selectively heating a narrow strip transverse to the length of said laminate to convert a corresponding narrow strip of said resinous composition to a gelled or relatively immobile and tacky state, and then severing the laminate into lengths at an intermediate line in said strip, whereby each said length is enclosed within a cellophane envelope sealed across at least two ends thereof by said immobile, gelled and tacky resinous composition.

7. A method of making a reinforced plastic panel of a resinous composition capable of polymerizing to form cross-link, three dimensional structures, comprising impregnating a continuous mat of chopped glass fibers with said resinous composition, enclosing the impregnated base in a cellophane envelope to form a laminate, progressively compressing said laminate to expel excess liquid and entrapped air from said base, sealing the marginal edges of said cellophane envelope, selectively heating a narrow strip across the length of said laminate to convert a corresponding narrow strip of said resinous composition to a gelled or relatively immobile and tacky state, and then severing the laminate into lengths at an intermediate line in said strip, whereby each said length of laminate is enclosed within a cellophane envelope sealed along all marginal edges thereof.

8. A method of making a reinforced plastic panel of a resinous composition capable of polymerizing to form cross-link, three dimensional structures, comprising impregnating a continuous mat of chopped glass fibers with said resinous compositions, enclosing the impregnated base between an envelope formed of at least one sheet of cellophane to form a laminate, and approximately simultaneously applying an adhesive to the marginal edges of said cellophane, progressively compressing said laminate to expel excess liquid and entrapped air from said base, urging the marginal edges of said cellophane envelope together into adhered relation, selectively converting a narrow strip of said resinous composition to a gelled or relatively immobile and tacky state across the length of said laminate, and then severing the laminate into lengths at an intermediate line in said strip, whereby said lengths of laminate are enclosed within a cellophane envelope sealed along all marginal edges thereof.

9. An article of manufacture comprising a fibrous base impregnated with a resinous composition capable of polymerizing to form rigid, solid structures, cover sheets about said impregnated base secured together along their marginal edges and sealing said base and resinous composition from a substantial contact with air, said cover sheets being sealed along at least two ends thereof by a narrow strip only of said resinous composition converted to a relatively immobile state, the entire article being sufficiently flexible for subsequent shaping and curing of the resinous composition.

10. A laminated article of manufacture comprising a mat of chopped glass fibers impregnated with a resinous composition capable of polymerizing to form a crosslink, three dimensional, rigid structure, enclosed within a cellophane envelope consisting of at least one cover sheet of cellophane folded over said mat and secured together along the marginal edges and sealing the impregnated mat from substantial contact with air, said laminate being closed along at least two marginal end edges thereof by a narrow strip only of gelled relatively immobilized and tacky portion of said resinous composition.

11. A laminated article of manufacture comprising a mat of chopped glass fibers covered on at least one surface thereof with a relatively thin surfacing mat of glass monofilaments to form a multiple ply reinforcing material, said reinforcing material being impregnated with a resinous composition capable of polymerizing to form rigid, solid structures, and at least one cover sheet of flexible, relatively nonporous material folded about said impregnated material and secured together along the marginal edges other than the folded edge and sealing the same from substantial contact with air, said laminate being closed along at least two marginal end edges thereof by a gelled, relatively immobilized and tackified elongated strip portion of said resinous composition.

12. A laminated article comprising a mat of chopped glass fibers covered on at least one surface thereof with a relatively thin surfacing mat of glass monofilaments thus forming a multiple ply reinforcing material, said reinforcing material being impregnated with a resinous composition capable of polymerizing to form rigid, solid structures, said impregnated material being enclosed within an envelope comprising at least one sheet of cellophane, said envelope being sealed around the marginal periphery thereof, thereby preventing substantial contact of said resinous composition with air, at least two of the ends of said envelope being sealed by gelled, relatively immobilized, and tackified narrow elongated strip portions of said resinous composition.

References Cited in the file of this patent

UNITED STATES PATENTS

| | | |
|---|---|---|
| 1,444,959 | Dickey | Feb. 13, 1923 |
| 2,526,945 | Gray | Oct. 24, 1950 |
| 2,631,955 | Muskat | Mar. 17, 1953 |
| 2,759,308 | Nawrocki | Aug. 21, 1956 |